US012603278B2

(12) United States Patent
Choi et al.

(10) Patent No.: US 12,603,278 B2
(45) Date of Patent: Apr. 14, 2026

(54) CATHODE ACTIVE MATERIAL, METHOD FOR MANUFACTURING THE SAME, AND SECONDARY LITHIUM ION BATTERY INCLUDING THE SAME

(71) Applicants: POSCO, Pohang-si (KR); RESEARCH INSTITUTE OF INDUSTRIAL SCIENCE & TECHNOLOGY, Pohang-si (KR); POSCO CHEMICAL CO., LTD, Pohang-si (KR)

(72) Inventors: Kwon Young Choi, Seoul (KR); Sang Cheol Nam, Seoul (KR); Sang Hyuk Lee, Incheon (KR); Inchul Park, Incheon (KR); Jong Il Park, Pohang-si (KR); Jung Hoon Song, Gwacheon-si (KR); Ohmin Kwon, Incheon (KR)

(73) Assignees: POSCO, Pohang-si (KR); RESEARCH INSTITUTE OF INDUSTRIAL SCIENCE & TECHNOLOGY, Pohang-si (KR); POSCO CHEMICAL CO., LTD, Pohang-si (KR)

( * ) Notice: Subject to any disclaimer, the term of this patent is extended or adjusted under 35 U.S.C. 154(b) by 882 days.

(21) Appl. No.: 17/787,191

(22) PCT Filed: Dec. 18, 2020

(86) PCT No.: PCT/KR2020/018641
§ 371 (c)(1),
(2) Date: Jun. 17, 2022

(87) PCT Pub. No.: WO2021/125870
PCT Pub. Date: Jun. 24, 2021

(65) Prior Publication Data
US 2023/0041710 A1 Feb. 9, 2023

(30) Foreign Application Priority Data
Dec. 19, 2019 (KR) ........................ 10-2019-0171281

(51) Int. Cl.
*H01M 4/36* (2006.01)
*C01G 53/50* (2025.01)
(Continued)

(52) U.S. Cl.
CPC ............ *H01M 4/366* (2013.01); *C01G 53/50* (2013.01); *H01M 4/0471* (2013.01);
(Continued)

(58) Field of Classification Search
CPC ................................................ H01M 2004/028
See application file for complete search history.

(56) References Cited

U.S. PATENT DOCUMENTS

| | | | | |
|---|---|---|---|---|
| 2014/0072874 A1* | 3/2014 | Kim | .................... | H01M 10/052 427/126.3 |
| 2015/0111106 A1* | 4/2015 | Son | ...................... | H01M 4/505 429/223 |
| 2019/0341598 A1* | 11/2019 | Nam | .................... | H01M 4/134 |

FOREIGN PATENT DOCUMENTS

| | | |
|---|---|---|
| CN | 110048089 A | 7/2019 |
| CN | 110178253 A | 8/2019 |

(Continued)

OTHER PUBLICATIONS

Ni-Rich LiNi0.8Co0.1Mn0.1O2 Oxide Coated by Dual-Conductive Layers as High Performance Cathode Material for Lithium-Ion Batteries, Shi Chen et al., ACS Applied Materials & Interfaces 2017 9 (35), 29732-29743 (Year: 2017).*

(Continued)

*Primary Examiner* — Maria Laios
(74) *Attorney, Agent, or Firm* — Sughrue Mion, PLLC

(57) ABSTRACT
Embodiments of the present invention relate to a cathode active material, a method for manufacturing the same, and a lithium secondary battery including the same.
According to an embodiment, a cathode active material can be provided, the cathode active material comprising: a (Continued)

lithium metal oxide including a core and a shell disposed on a surface of the core; and a coating layer disposed on a surface of the lithium metal oxide, wherein a c value that satisfies Equation 1 and is in a range of 0.3 to 0.7, and the core and the shell have a layered crystalline structure.

$$c = b/a \qquad \text{[Equation 1]}$$

(in Equation 1, a is a peak at 530 to 533 eV and b is a peak at 528 to 531 eV in an XPS spectrum of the coating layer).

7 Claims, 7 Drawing Sheets

(51) Int. Cl.

| | |
|---|---|
| *H01M 4/02* | (2006.01) |
| *H01M 4/04* | (2006.01) |
| *H01M 4/505* | (2010.01) |
| *H01M 4/525* | (2010.01) |
| *H01M 10/0525* | (2010.01) |

(52) U.S. Cl.
CPC ........... *H01M 4/505* (2013.01); *H01M 4/525* (2013.01); *H01M 10/0525* (2013.01); *C01P 2002/85* (2013.01); *C01P 2004/04* (2013.01); *H01M 2004/021* (2013.01); *H01M 2004/028* (2013.01)

(56) References Cited

FOREIGN PATENT DOCUMENTS

| | | | |
|---|---|---|---|
| JP | 8-171935 | A | 7/1996 |
| JP | 2011-228293 | A | 11/2011 |
| JP | 2019-91692 | A | 6/2019 |
| KR | 10-2007-0097923 | A | 10/2007 |
| KR | 10-2011-0127209 | A | 11/2011 |
| KR | 10-2014-0109317 | A | 9/2014 |
| KR | 10-2014-0130067 | A | 11/2014 |
| KR | 10-2015-0080199 | A | 7/2015 |
| KR | 10-2017-0067086 | A | 6/2017 |
| KR | 10-2018-0015044 | A | 2/2018 |
| KR | 10-2018-0015045 | A | 2/2018 |
| KR | 10-2018-0084727 | A | 7/2018 |
| KR | 10-2018-0121266 | A | 11/2018 |
| KR | 10-2019-0055729 | A | 5/2019 |

OTHER PUBLICATIONS

Office Action issued Jun. 28, 2023 in Chinese Application No. 202080088033.X.

Office Action issued Jun. 7, 2024 in Chinese Application No. 202080088033.X.

Shi Chen, et al., "Ni-Rich LiNi0.8CO0.1Mn0.1O2 Oxide Coated by Dual-Conductive Layers as High Performance Cathode Material for Lithium-Ion Batteries", ACS Applied Materials & Interfaces, 2017, pp. 29732-29743, vol. 9, No. 35.

International Search Report for PCT/KR2020/018641 dated Apr. 26, 2021.

Japanese Notice of Allowance dated Jul. 11, 2023 in Japanese Application No. 2022-538285.

Extended European Search Report issued Jan. 5, 2024 in European Application No. 20902915.6.

* cited by examiner

CATHODE ACTIVE MATERIAL, METHOD FOR MANUFACTURING THE SAME, AND SECONDARY LITHIUM ION BATTERY INCLUDING THE SAME

CROSS REFERENCE TO RELATED APPLICATIONS

This application is a National Stage of International Application No. PCT/KR2020/018641 filed Dec. 18, 2020, claiming priority based on Korean Patent Application No. 10-2019-0171281 filed Dec. 19, 2019, the entire disclosures of which are incorporated herein by reference.

TECHNICAL FIELD

The present invention relates to a cathode active material, a method for manufacturing the same, and a lithium secondary battery including the same.

BACKGROUND ART

Recently, with the explosive increase in demand for IT mobile devices and small electric power driving devices (e-bikes, small EVs, etc.), and the demand for electric vehicles with a driving distance of 400 km or more, the development of secondary batteries with high capacity and high energy density to drive these devices and the electric vehicles is being actively carried out around the world.

In order to manufacture such a high-capacity battery, it is necessary to use a high-capacity cathode active material.

Among the existing layered cathode active materials, $LiNiO_2$ (275 mAh/g) is a material with the highest capacity, but a structure of $LiNiO_2$ easily collapses during charging and discharging and thermal stability of $LiNiO_2$ is low due to oxidation number problem, so $LiNiO_2$ is difficult to use commercially.

In order to solve this problem, it is necessary to substitute other stable transition metals (Co, Mn, etc.) in an unstable Ni site. To this end, a ternary NCM system in which Co and Mn are substituted has been developed.

However, in the case of the ternary NCM, the thermal stability decreases as a content of Ni increases.

DISCLOSURE

Technical Problem

The present invention has been made in an effort to provide a cathode active material in which a decomposition reaction of an electrolyte on a surface is suppressed. Accordingly, it is possible to improve high-temperature lifespan characteristics and thermal stability.

Technical Solution

An exemplary embodiment of the present invention provides a cathode active material including: a lithium metal oxide including a core and a shell disposed on a surface of the core; and a coating layer disposed on a surface of the lithium metal oxide, wherein a c value that satisfies Equation 1 and is in a range of 0.3 to 0.7, and the core and the shell have a layered crystalline structure.

$$c = b/a \qquad \text{[Equation 1]}$$

(in Equation 1, a is a peak at 530 to 533 eV and b is a peak at 528 to 531 eV in an XPS spectrum of the coating layer)

Another embodiment of the present invention provides a method for manufacturing a cathode active material, including: preparing a mixture by mixing a precursor of lithium metal oxide and a raw material of a doping element; acquiring lithium metal oxide by firing the mixture; and forming a coating layer on a surface of the lithium metal oxide by washing the lithium metal oxide with distilled water and a washing liquid containing a manganese compound, in which the lithium metal oxide on which the coating layer is formed may have a c value that satisfies Equation 1 and is in a range of 0.3 to 0.7.

$$c = b/a \qquad \text{[Equation 1]}$$

(in Equation 1, a is a peak at 530 to 533 eV obtained through measurement in the XPS spectrum of the coating layer and b is a peak at 528 to 531 eV in an XPS spectrum of the coating layer)

Yet another embodiment of the present invention provides a lithium secondary battery, including: a cathode containing the cathode active material according to the exemplary embodiment; an anode containing an anode active material; and an electrolyte disposed between the cathode and the anode.

Advantageous Effects

According to an embodiment, as a cathode active material includes a coating layer on a surface of a lithium metal oxide having a core-shell structure, an intensity ratio of a peak at 528 to 531 eV to a peak at 530 to 533 eV in an XPS spectrum satisfies a range of 0.3 to 0.7. Accordingly, it is possible to suppress a decomposition reaction on a surface of the cathode active material. In addition, it is possible to significantly improve high-temperature lifespan characteristics and significantly improve thermal stability of a cathode active material due to a reduction in a side reaction of an electrolyte.

MODE FOR INVENTION

Figure 1:
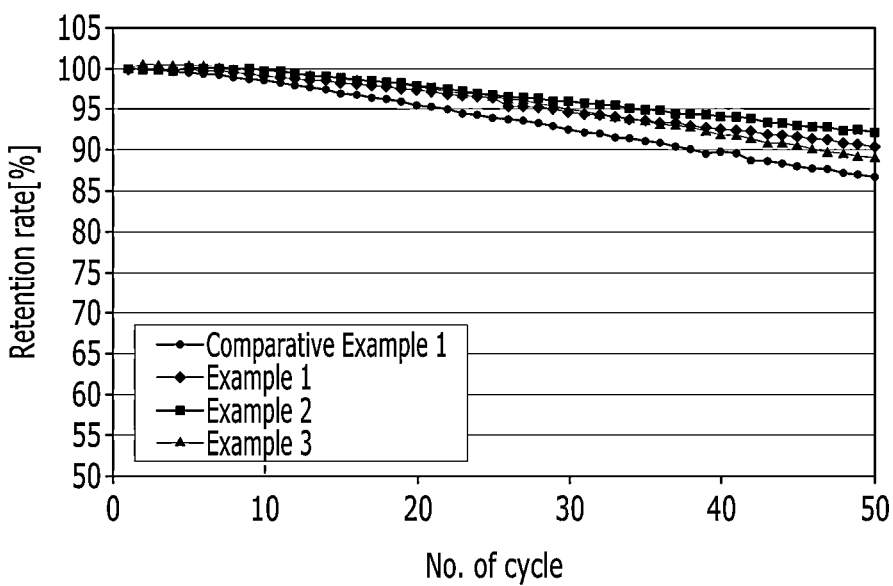
FIG. 1 is a diagram illustrating capacity retention rate measurement results for Examples 1 to 3 and Comparative Example 1.

Hereinafter, an exemplary embodiment of the present invention is described in detail. However, it is to be understood that this exemplary embodiment is provided as an example, and the present invention is not limited by this exemplary embodiment, but is defined by only the scope of claims to be described below.

A cathode active material according to an exemplary embodiment includes a lithium metal oxide and a coating layer disposed on a surface of the lithium metal oxide.

The lithium metal oxide may include a core and a shell disposed on a surface of the core. In addition, the core and the shell may have a layered crystalline structure.

The cathode active material according to the present exemplary embodiment may have a c value that satisfies Equation 1 and is in a range of 0.3 to 0.7.

$$c = b/a \qquad \text{[Equation 1]}$$

(in Equation 1, a is a peak at 530 to 533 eV and b is a peak at 528 to 531 eV in an XPS spectrum of the coating layer)

In this case, the c value may be more specifically in the range of 0.35 to 0.6 or 0.4 to 0.57. When the c value satisfies the above range, it is possible to improve the high-temperature lifespan of the lithium secondary battery to which the cathode active material of the present embodiment is applied.

Meanwhile, a d-spacing value of a crystalline structure in the coating layer may be smaller than a d-spacing value of a crystalline structure in the lithium metal oxide.

More specifically, the d-spacing value of the crystal structure in the coating layer of the cathode active material of the present exemplary embodiment may be in the range of 0.24 to 0.43 nm, and more specifically, in the range of 0.30 to 0.43 nm or 0.40 to 0.43 nm. When the d-spacing value of the coating layer satisfies the above range, it is possible to significantly improve the high-temperature lifespan of the lithium secondary battery to which the cathode active material of the present exemplary embodiment is applied.

In addition, the d-spacing value of the crystal structure in the lithium metal oxide may be in a range of 0.465 to 0.480 nm. When the d-spacing value of the lithium metal oxide satisfies the above range, it is possible to significantly improve the capacity and lifespan characteristics of the lithium secondary battery to which the cathode active material of the present exemplary embodiment is applied.

The coating layer may include at least one of the layered crystalline structure and a spinel crystalline structure.

Next, the coating layer includes at least one element selected from the group consisting of, for example, Mn, S, Co, Ni, and Li.

A content of Mn contained in the coating layer is 0.15 to 0.45 mol % and more specifically 0.15 to 0.3 mol %, based on the total cathode active material. When the content of Mn contained in the coating layer satisfies the above range, the high-temperature lifespan characteristics of the lithium secondary battery may be improved.

Meanwhile, in the present exemplary embodiment, the content of nickel in the metal in the lithium metal oxide may be 80 mol % or more. More specifically, the lithium metal oxide may be represented by, for example, Chemical Formula 1 below.

$$Li_xNi_aCo_bMn_cM1_dM2_eO_2 \qquad \text{[Chemical Formula 1]}$$

In Chemical Formula 1, M1 and M2 each are at least one of Zr, Ti, Mg, Al, Ni, Mn, Zn, Fe, Cr, Mo, and W, x is $0.90 \leq x \leq 1.07$, a is $0.80 \leq a < 1$, b is $0 < b \leq 0.3$, c is $0 < c \leq 0.3$, d is $0 < d < 0.01$, e is $0 < e < 0.01$, and a+b+c+d+e=1.

In this case, a may be $0.85 \leq a < 1$, and more specifically, $0.90 \leq a < 1$.

In addition, b may be $0 < b \leq 0.2$ or $0 < b \leq 0.1$, and c may be $0 < c \leq 0.2$ or $0 < c \leq 0.1$.

In addition, M1 may be Zr, and M2 may be Al. When M1 is Zr and M2 is Al, the cathode active material of the present exemplary embodiment may contain 0.05 to 0.6 parts by weight of Zr, and 0.01 to 0.4 parts by weight of Al, based on the total lithium metal oxide.

According to the present exemplary embodiment, when the content of nickel in the metal in the lithium metal oxide is 80% or more, that is, when a in Chemical Formula 1 is 0.80 or more, it is possible to implement the cathode active material having high output characteristics. Since the cathode active material of the present exemplary embodiment having such a composition has an increased energy density per volume, the capacity of a battery to which the cathode active material is applied may be improved, and the cathode active material is also suitable for use in electric vehicles.

Next, the lithium metal oxide may include a core and a shell disposed on a surface of the core. Both the core and the shell have the layered crystalline structure. In addition, in the lithium metal oxide, the nickel has a concentration gradient from a core part to a shell part, and there may be a concentration gradient in a region of up to 95 length % of a total radius of the lithium metal oxide. In this case, when the nickel concentration of the core part is 100 mol %, the nickel concentration of the shell part may be gradually decreased to 50 mol %. For convenience, the nickel is taken as an example, but the description of the concentration gradient may also be applied to manganese and cobalt.

A method for manufacturing a cathode active material according to another exemplary embodiment may include preparing a mixture by mixing a precursor of lithium metal oxide and a raw material of a doping element, acquiring lithium metal oxide by firing the mixture, and forming a coating layer on a surface of the lithium metal oxide by washing the lithium metal oxide with distilled water and a washing liquid containing a manganese compound.

In this case, the lithium metal oxide on which the coating layer is formed may have a c value that satisfies Equation 1 and is in a range of 0.3 to 0.7.

$$c = b/a \qquad \text{[Equation 1]}$$

(in Equation 1, a is a peak at 530 to 533 eV and b is a peak at 528 to 531 eV in an XPS spectrum of the coating layer)

In the present exemplary embodiment, the characteristics related to Equation 1 are the same as those of the cathode active material according to the above-described exemplary embodiment. Accordingly, this has been described in detail in the cathode active material according to the exemplary embodiment, and therefore, will be omitted herein.

Meanwhile, a d-spacing value of a crystalline structure in the coating layer may be smaller than a d-spacing value of a crystalline structure in the lithium metal oxide. The characteristics of the d-spacing value are the same as those of the cathode active material according to the above-described exemplary embodiment. Accordingly, this has been described in detail in the cathode active material according to the exemplary embodiment, and therefore, will be omitted herein.

First, the preparing of the mixture by mixing the precursor of lithium metal oxide and the raw material of the doping element is performed by preparing the lithium metal oxide precursor by the method described in the exemplary example to be described later, and then preparing and mixing the raw material of the doping element.

Thereafter, the firing of the mixture to obtain the lithium metal oxide is performed. The firing is performed by the conventional method, and may specifically include the firing, cooling, and pulverization processes.

Next, the forming of the coating layer on the surface of the lithium metal oxide is performed.

The forming of the coating layer may include washing the lithium metal oxide with the washing liquid. In this case, the washing liquid may include distilled water and a manganese compound. The manganese compound may be, for example, at least one selected from the group consisting of manganese sulfate, manganese nitrate, manganese chloride, and manganese acetate.

More specifically, the washing liquid may contain 1.5 to 4.5 mol % and more specifically, 1.5 to 3.0 mol % of the manganese compound based on the total washing liquid. When the content of Mn compound satisfies the above range, it is possible to improve the high-temperature lifespan characteristics of the lithium secondary battery.

Meanwhile, the forming of the coating layer may further include performing heat treatment after washing with the washing liquid.

The performing of the heat treatment may be performed for 5 to 10 hours in a temperature range of 600 to 800° C. This is an appropriate temperature and time range that removes moisture, etc. remaining on the surface of the cathode active material treated with the washing liquid and does not deteriorate the high-temperature lifespan characteristics.

These process conditions will be described in more detail in the exemplary embodiment to be described later.

In another exemplary embodiment of the present invention, a lithium secondary battery that includes a cathode including the cathode active material according to the exemplary embodiment of the present invention described above, an anode including an anode active material, and an electrolyte disposed between the cathode and the anode is provided.

The description related to the cathode active material will be omitted because it is the same as the above-described exemplary embodiment of the present invention.

The cathode active material layer may include a binder and a conductive material.

The binder serves to attach cathode active material particles well to each other and also to attach the cathode active material to the current collector.

The conductive material is used to impart conductivity to the electrode, and in the configured battery, any electronically conductive material may be used without causing a chemical change.

The anode includes a current collector and an anode active material layer formed on the current collector, and the anode active material layer includes an anode active material.

The anode active material contains a material capable of reversibly intercalating/de-intercalating lithium ions, lithium metal, an alloy of lithium metal, a material capable of doping and de-doping lithium, or a transition metal oxide.

The material capable of reversibly intercalating/de-intercalating the lithium ions is a carbon material, and any carbon-based anode active material generally used in a lithium ion secondary battery may be used, and as a representative example thereof may include crystalline carbon, amorphous carbon, or both of them.

The alloy of lithium metal may include an alloy of lithium and metal selected from the group consisting of Na, K, Rb, Cs, Fr, Be, Mg, Ca, Sr, Si, Sb, Pb, In, Zn, Ba, Ra, Ge, Al and Sn.

A material capable of doping and de-doping the lithium may include Si, $SiO_x$ ($0<x<2$), Si—Y alloy (where Y is an element selected from the group consisting of alkali metal, alkaline earth metal, group 13 element, group 14 element, transition metal, rare earth element, and combinations thereof, and is not Si), Sn, $SnO_2$, Sn—Y (wherein Y is an element selected from the group consisting of alkali metal, alkaline earth metal, group 13 element, group 14 element, transition metal, rare earth element, and combinations thereof, and is not Sn) and the like.

Examples of the transition metal oxide may include vanadium oxide, lithium vanadium oxide, and the like. The anode active material layer may also include a binder, and may optionally further include a conductive material.

The binder serves to attach anode active material particles well to each other and also to attach the anode active material to the current collector.

The conductive material is used to impart conductivity to the electrode, and in the configured battery, any electronically conductive material may be used without causing a chemical change.

As the current collector, one selected from the group consisting of copper foil, nickel foil, stainless steel foil, titanium foil, nickel foam, copper foam, a polymer substrate coated with a conductive metal, and combinations thereof may be used.

The anode and the cathode are manufactured by mixing an active material, a conductive material, and a binder in a solvent to prepare an active material composition, and applying the composition to the current collector. Since such an electrode manufacturing method is widely known in the art, a detailed description thereof will be omitted herein. The solvent may include, but is not limited to, N-methylpyrrolidone.

The electrolyte includes a non-aqueous organic solvent and a lithium salt.

The non-aqueous organic solvent serves as a medium through which ions involved in an electrochemical reaction of the battery may move.

The lithium salt is dissolved in an organic solvent, serves as a source of lithium ions in the battery to enable an operation of a basic lithium secondary battery and promote movement of lithium ions between the cathode and the anode.

Depending on the type of lithium secondary battery, a separator may exist between the cathode and the anode. As such a separator, it goes without saying that a mixed multilayer such as polyethylene, polypropylene, polyvinylidene fluoride, or a multilayer film of two or more layers thereof may be used. A polyethylene/polypropylene two-layer separator, a polyethylene/polypropylene/polyethylene three-layer separator, and polypropylene/polyethylene/polyethylene/polypropylene three-layer separator may be used.

The lithium secondary battery may be classified into a lithium ion battery, a lithium ion polymer battery, and a lithium polymer battery depending on the type of separator and electrolyte used, may be classified into a cylindrical type, a prismatic type, a coin type, a pouch type, etc. according to the shape, and may be classified into a bulk type and a thin film type depending on a size. Since the structure and manufacturing method of these batteries are well known in the art, a detailed description thereof will be omitted.

Hereinafter, an exemplary embodiment of the present invention is described in detail. However, it is to be understood that this exemplary embodiment is provided as an example, and the present invention is not limited by this exemplary embodiment, but is defined by only the scope of claims to be described below.

(Example 1) Manufacturing of Cathode Active Material Having 88 Mol % of Ni

1) Manufacturing of Cathode Active Material Precursor

A cathode active material precursor was prepared by a general co-precipitation method. Specifically, a supply solution was designed by using $(Ni_{0.98}Co_{0.01}Mn_{0.01}, OH)_2$ as a composition of a core part and $(Ni_{0.64}C_{0.23}M_{0.13}, OH)_2$ as a shell part.

In addition, a first supply tank having a high Ni concentration and a second supply tank having a low Ni concentration were arranged in series to form a core shell gradient (CSG) structure. This is to keep the Ni concentration of the core part constant and change the Ni concentration of the shell part.

$NiSO_4 \cdot 6H_2O$ was used as a raw material for nickel, $CoSO_4 \cdot 7H_2O$ was used as a raw material for cobalt, and $MnSO_4 \cdot H_2O$ was used as a raw material for manganese. These raw materials were dissolved in distilled water to prepare a 2.5 M aqueous metal salt solution.

After preparing a co-precipitation reactor, $N_2$ was purged to prevent oxidation of metal ions during the co-precipitation reaction, and the temperature of the reactor was maintained at 50° C.

A metal salt aqueous solution and $NH_4(OH)$ as a chelating agent were added to the co-precipitation reactor. In addition, NaOH was used for pH adjustment. A precipitate acquired according to the co-precipitation process was filtered, washed with distilled water, and dried in an oven at 100° C. for 24 hours to prepare the cathode active material precursor.

The composition of the prepared precursor was $(Ni_{0.88}Co_{0.095}Mn_{0.025}, OH)_2$, and an average particle diameter D50 thereof was 14.8 μm.

2) Manufacturing of Cathode Active Material

Based on 1 mole of the cathode active material precursor prepared in 1) above, a mixture was prepared by uniformly mixing 1.05 moles of $LiOH \cdot H_2O$ (Samjeon Chemical, battery grade), $ZrO_2$ (Aldrich, 4N) so that Zr becomes 3,400 ppm, and $Al(OH)_3$ (Aldrich, 4N) so that Al becomes 280 ppm.

The mixture was charged into a tube furnace, fired while introducing oxygen, cooled to room temperature, and then pulverized to prepare fired powder.

Next, for the washing process, 0.082 g of manganese sulfate ($MnSO_4 \cdot H_2O$) was added to 100 g of distilled water (D. I. water) and stirred for 1 minute to prepare a washing liquid.

100 g of the fired powder was added to the washing liquid, stirred for 10 minutes, and then filtered. After washing with water, the filtered fired powder was dried in a chamber at 100° C. or higher, and then heat-treated in an oxygen atmosphere and 750° C. for 5 hours to finally obtain the cathode active material.

Examples 2 and 3 and Comparative Example 1

A cathode active material was prepared in the same manner as in Example 1, except that a composition of a washing liquid was adjusted as shown in Table 1 below.

Comparative Example 2—Cathode Active Material (Bulk) when Core has a Layered Structure and Shell has a Spinel Structure 1) Manufacturing of Cathode Active Material Precursor A precursor for manufacturing a cathode active material was prepared by a general co-precipitation method.

First, $NiSO_4 \cdot 6H_2O$, $CoSO_4 \cdot 7H_2O$, $MnSO_4 \cdot H$ were prepared as raw materials, and then these materials were dissolved in distilled water to prepare a 2.5M of aqueous metal salt solution.

Next, after preparing a co-precipitation reactor, $N_2$ was purged to prevent oxidation of metal ions during the co-precipitation reaction, and the temperature of the reactor was maintained at 50° C.

$NH_4(OH)$ as an aqueous solution of a metal salt and a chelating agent was introduced into the co-precipitation reactor. In addition, NaOH was used for pH adjustment. The precipitate obtained according to the co-precipitation process was filtered, washed with distilled water, and then dried in an oven at 100° C. for 24 h.

The composition of the prepared precursor was $(Ni_{0.88}Co_{0.095}Mn_{0.025}, OH)_2$, and an average particle diameter D50 thereof was 15.0 μm.

2) Manufacturing of Cathode Active Material

Based on 1 mole of the cathode active material precursor prepared in 1) above, a mixture was prepared by uniformly mixing 1.05 moles of $LiOH \cdot H_2O$ (Samjeon Chemical, battery grade), $ZrO_2$ (Aldrich, 4N) so that Zr becomes 3,400 ppm, and $Al(OH)_3$ (Aldrich, 4N) so that Al becomes 280 ppm.

The mixture was charged into a tube furnace, fired while introducing oxygen, cooled to room temperature, and then pulverized to prepare fired powder.

Next, for the washing process, 0.385 g of manganese sulfate ($MnSO_4 \cdot H_2O$) and 0.147 g of lithium hydroxide was added to 100 g of distilled water (D. I. water) and stirred for 1 minute to prepare a washing liquid.

100 g of the fired powder was added to the washing liquid, stirred for 10 minutes, and then filtered. After washing with water, the filtered fired powder was dried in a chamber at 100° C. or higher, and then heat-treated in an oxygen atmosphere and 750° C. for 3 hours to finally obtain the cathode active material.

TABLE 1

| Division | Composition of washing liquid | Heat treatment condition | |
| | | Heat treatment temperature (° C.) | Time (hr) |
| --- | --- | --- | --- |
| Example 1 | 0.082 g of manganese sulfate + 100 g of distilled water | 750 | 5 |
| Example 2 | 0.165 g of manganese sulfate + 100 g of distilled water | 750 | 5 |
| Example 3 | 0.248 g of manganese sulfate + 100 g of distilled water | 750 | 5 |
| Comparative Example 1 | 100 g of distilled water | 750 | 5 |
| Comparative Example 2 | 0.385 g of manganese sulfate + 0.147 g of lithium hydroxide + 100 g of distilled water | 750 | 5 |

(Experimental Example 1) Evaluation of Electrochemical Property

After preparing a 2032 coin type half cell using a cathode active material prepared according to Examples 1 to 3 and Comparative Examples 1 and 2, electrochemical evaluation was performed.

(1) Manufacturing of Coin Type Half Cell

Specifically, a cathode active material, a polyvinylidene fluoride binder (trade name: KF1100), and a denka black conductive material were mixed in a weight ratio of 92.5:3.5:4, and the mixture was added to an N-methyl-2-pyrrolidone solvent so that a solid content was about 30% by weight to prepare the cathode active material slurry.

The slurry was coated on aluminum foil (thickness: 15 μm) as a cathode current collector using a doctor blade, dried and rolled to prepare a cathode. A loading amount of the cathode was about 14.6 mg/cm², and a rolling density was about 3.1 g/cm³.

A 2032 coin type half cell was manufactured in a conventional manner using the cathode, a lithium metal anode (thickness 200 μm, Honjo metal), an electrolyte, and a polypropylene separator. The electrolyte in which 1M of LiPF₆ is dissolved in a mixed solvent (mixing ratio EC:DMC:EMC=3:4:3 vol %) of ethylene carbonate, dimethyl carbonate, and ethylmethyl carbonate (EMC) to prepare a mixed solution, and 1.5 wt % of vinylene carbonate (VC) is added to the mixed solution was used.

(2) 45° C. High Temperature Cycle Characteristic Evaluation

The coin type half cell manufactured in (1) was aged at room temperature (25° C.) for 10 hours, and then was subjected to a charge/discharge test.

For capacity evaluation, 215 mAh/g was used as reference capacity, and CC/CV 2.5 to 4.25 V, 1/20 C cut-off was applied for charge/discharge conditions. Initial capacity was performed under 0.2 C charge/0.2 C discharge conditions. As for the high-temperature cycle lifespan characteristics, a retention rate of 50th capacity compared to first capacity after measurements 50 times under 0.5 C charge/0.5 C discharge conditions at high temperature (45° C.) is illustrated in FIG. 1.

Referring to FIG. 1, it could be seen that Examples 1 to 3 in which the coating layer is formed on the surface of the lithium metal oxide have superior high-temperature cycle lifespan compared to Comparative Example 1 in which the coating layer is not formed.

(Experimental Example 2) X-Ray Photoelectron Spectroscopy (XPS) O1 s Analysis

Figure 2:
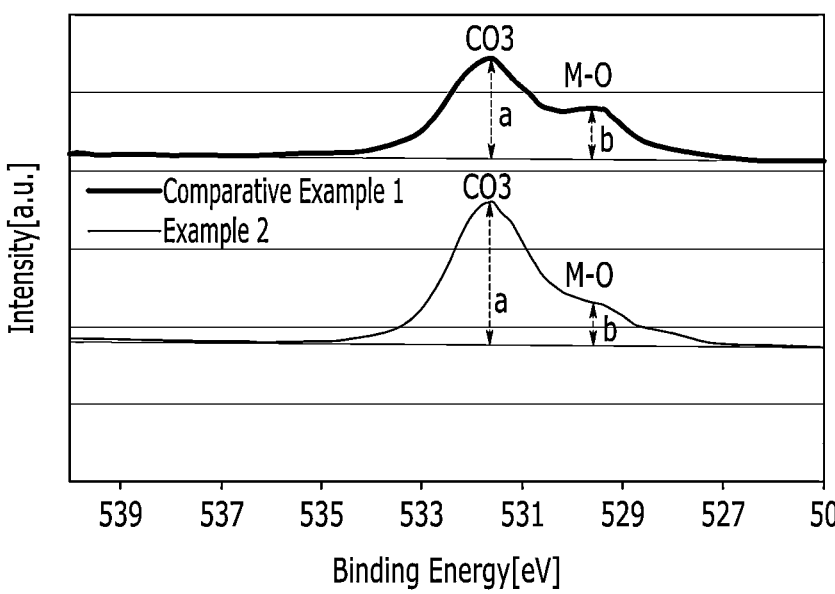
FIG. 2 is a diagram illustrating X-ray photoelectron spectroscopy (XPS) analysis results of a coating layer of a cathode active material manufactured according to Example 1 and Comparative Example 1.

FIG. 2 illustrates X-ray photoelectron spectroscopy (XPS) analysis results of a coating layer of a cathode active material manufactured according to Example 1 and Comparative Example 1.

In FIG. 2, an intensity ratio of a $CO_3$ peak having a binding energy of 530 to 533 eV and an M-O peak near 528 to 531 eV was defined as in Equation 1 below, and a c value was calculated and shown in Table 2 below.

$$c=b/a \qquad \text{[Equation 1]}$$

(in Equation 1, a is a peak at 530 to 533 eV and b is a peak at 528 to 531 eV in an XPS spectrum of the coating layer)

Referring to FIG. 2 and Table 2, it could be seen that, in Comparative Example 1, the c value was only 0.28, but in Examples 1 to 3, the c value was included in the range of 0.4 to 0.57. That is, when the range of the c value satisfies the range of the present exemplary embodiment, it could be seen that the high-temperature lifespan characteristics are excellent as shown in Experimental Example 1.

(Experimental Example 3) Transmission Electron Microscopy (TEM) Analysis

Figure 3A:
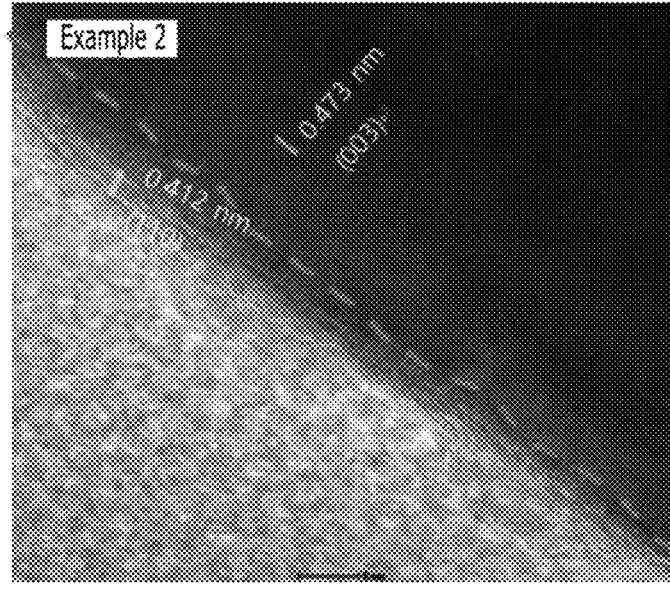
FIGS. 3A and 3B are diagrams illustrating TEM analysis results of a cathode active material manufactured according to Examples 2 and 3, respectively.
Figure 3B:
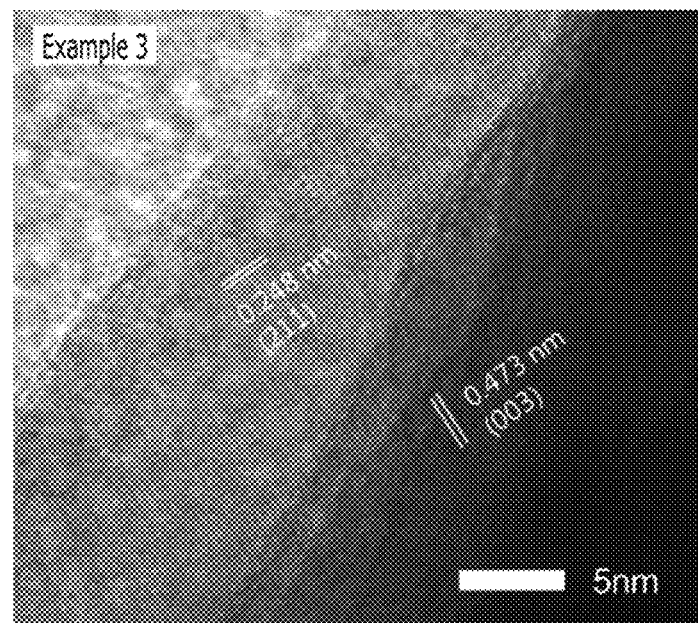
Figure 3C:
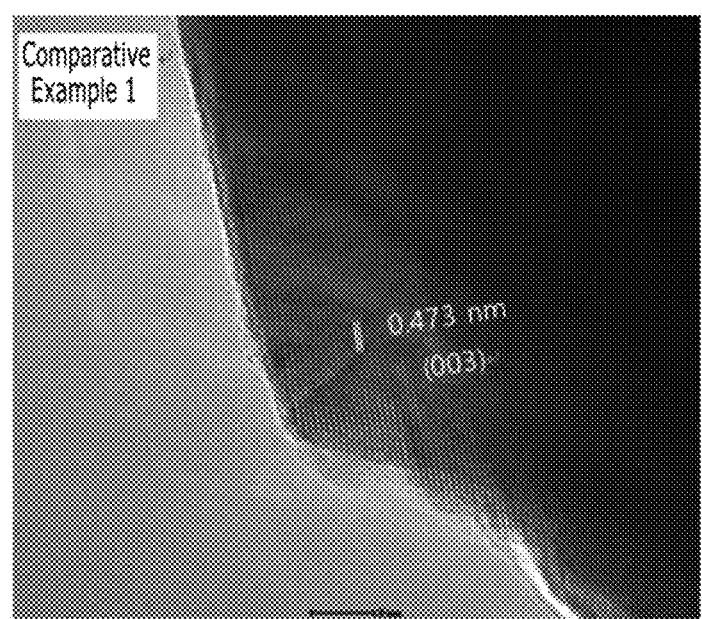
FIGS. 3C and 3D are diagrams illustrating TEM analysis results of a cathode active material manufactured according to Comparative Examples 1 and 2, respectively.
Figure 3D:
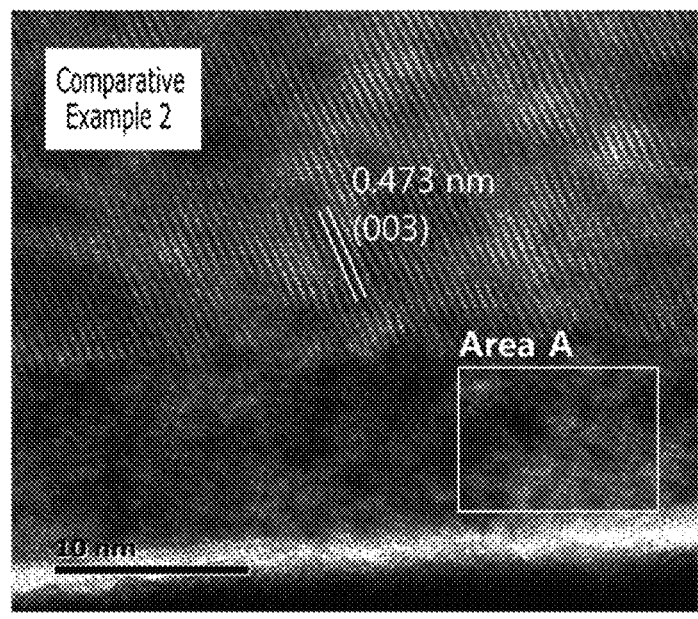

TEM analysis was performed on cathode active materials manufactured according to Comparative Examples 1 and 2 and Examples 2 and 3, and d-spacing values inside the coating layer and lithium metal oxide are illustrated in FIGS. 3A to 3D, respectively. FIG. 3A is the cathode active material of Example 2, FIG. 3B is the cathode active material of Example 3, FIG. 3C is the cathode active material of Comparative Example 1, and FIG. 3D is the cathode active material of Comparative Example 2.

Referring to FIG. 3A, the d-spacing value of the coating layer having the layered crystalline structure in the cathode active material of Example 2 is 0.412 nm, and the d-spacing value of the lithium metal oxide having the layered crystalline structure is 0.473 nm, and therefore, it could be seen that the d-spacing value of the coating layer is smaller than that of lithium metal oxide.

Referring to FIG. 3B, the d-spacing value of the coating layer having the spinel crystalline structure in the cathode active material of Example 3 is 0.248 nm, and the d-spacing value of the lithium metal oxide in which all the shells have the layered crystalline structure is 0.473 nm, and therefore, it could be seen that the d-spacing value of the coating layer is smaller than that of lithium metal oxide.

Referring to FIG. 3C, it could be seen that the cathode active material of Comparative Example 1 did not form the coating layer, and the d-spacing value of the lithium metal oxide was 0.473 nm.

Figure 3E:
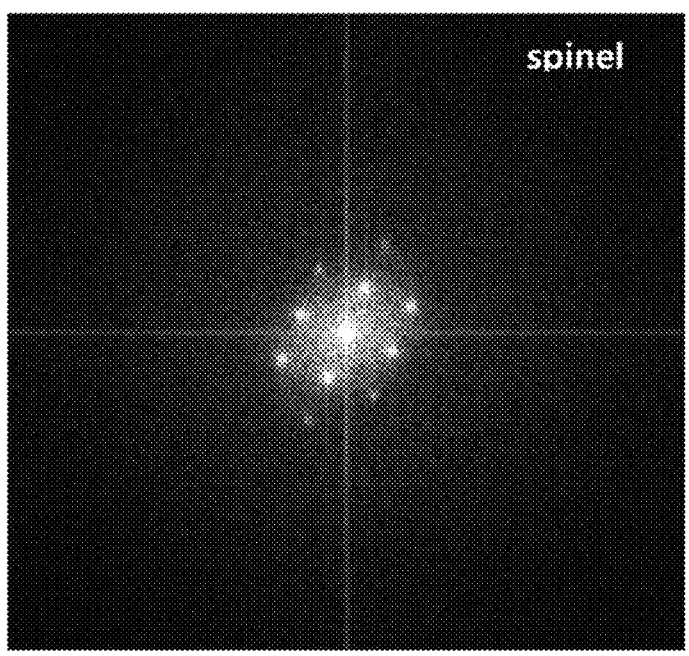
FIG. 3E is a diagram illustrating a Fast Fourier Transform (FFT) analysis result of region A of FIG. 3D.

In addition, referring to FIG. 3D and FIG. 3E which is an enlarged partial region of the shell in FIG. 3D, it could be seen that, in the cathode active material of Comparative Example 2, the shell has the spinel structure, and the core has the layered crystalline structure. In this case, the d-spacing value of the core having the layered crystalline structure is 0.473 nm.

(Experimental Example 4) Measurement of Average Particle Size of Cathode Active Material Average particle sizes (D50, μm) of the cathode active materials manufactured according to Comparative Example 1 and Examples 1 to 3 were measured using a particle size analyzer. The results were shown in Table 2 below.

(Experimental Example 5) Measurement of Specific Surface Area of Cathode Active Material For the cathode active materials manufactured according to Comparative Example 1 and Examples 1 to 3, a specific surface area was measured using a BET measuring device (QuantaChrome, Autosorb-iQ/MP). The results were shown in Table 2 below.

(Experimental Example 6) Evaluation of Thermal Stability

Using the cathode active materials of Examples 1 to 3 and Comparative Example 1, a coin type half battery was manufactured in the same manner as in (1) of Experimental Example 1, and then charged by applying 2.5 to 4.25 V, 1/20 C cut-off.

The cathode is recovered from the charged battery in a dry room without moisture, and then is washed with dimethyl carbonate (DMC) and dried naturally.

Thereafter, 10 mg of cathode active material was collected, and the collected cathode active material was sealed in a differential scanning calorimetry (DSC) device (high pressure pan) together with 10 μl of electrolyte (1 M LiPF₆ EC/DMC/EMC=30/40/30 (Vol %)).

The calorific change was measured by a method for increasing the temperature from 25° C. to 400° C. at a temperature rise rate of 5° C. per minute. The thermal stability evaluation result, that is, a heat generation onset temperature and the maximum peak temperature were shown in Table 2 below, and the heat value (value obtained by integrating a heat generation value curve on the DSC with respect to the temperature) was shown in FIG. 4 and Table 2 below.

TABLE 2

| Divi-sion | Particle size [D50, μm] | Specific surface area [m²/g] | C value | 45° C. Life-span [%] | Peak temper-ature (° C.) | Heat value (w/g) |
|---|---|---|---|---|---|---|
| Com-parative Exam-ple 1 | 14.9 | 0.94 | 0.28 | 86.69 | 219.8 | 1590 |
| Exam-ple 1 | 15.0 | 0.99 | 0.40 | 90.38 | — | — |
| Exam-ple 2 | 15.1 | 0.96 | 0.49 | 91.96 | 220.4 | 1428 |
| Exam-ple 3 | 14.8 | 0.92 | 0.57 | 90.85 | 220.6 | 1398 |
| Com-parative Exam-ple 2 | 15.0 | 0.93 | 0.58 | 87.9 | 220.2 | 1402 |

Referring to Table 2, in the case of Examples 1 to 3, it could be confirmed that the C value has a value of 0.35 or more, the high-temperature lifespan characteristics are at least 90% or more, and the heat value is a very low value as 1500 or less On the other hand, in Comparative Example 1, it could be seen that the c value is significantly lower than in Examples 1 to 3, the high-temperature lifespan characteristics are also low, and the heat value is very high. That is, in the case of Comparative Example 1, it could be seen that the high-temperature lifespan characteristics and thermal stability are not as good as those of Examples. In addition, in the case of Comparative Example 2, it could be seen that the high-temperature lifespan characteristics are significantly reduced compared to the Examples.

The present invention is not limited to the exemplary embodiments, but may be manufactured in a variety of different forms, and the present invention may be manufactured in a variety of different forms, and those of ordinary skill in the art to which the present invention pertains will understand that the present invention may be implemented in other specific forms without changing the technical spirit or essential features of the present invention. Therefore, it should be understood that the above-mentioned exemplary embodiments are exemplary in all aspects but are not limited thereto.

The invention claimed is:

1. A cathode active material, comprising:

a lithium metal oxide including a core and a shell disposed on a surface of the core; and a coating layer disposed on a surface of the lithium metal oxide, wherein a c value that satisfies Equation 1 and is in a range of 0.3 to 0.7, wherein:

a d-spacing value of a crystalline structure in the coating layer is in a range of 0.24 to 0.43 nm, wherein the coating layer includes Mn, and the core and the shell have a layered crystalline structure, $$c = b/a \qquad \text{[Equation 1]}$$

(in Equation 1, a is a peak at 530 to 533 eV and b is a peak at 528 to 531 eV in an XPS spectrum of the coating layer).

2. The cathode active material of claim 1, wherein:

a d-spacing value of a crystalline structure in the coating layer is smaller than a d-spacing value of a crystalline structure in the lithium metal oxide.

3. The cathode active material of claim 1, wherein:

a d-spacing value of a crystal structure of the lithium metal oxide is in a range of 0.465 to 0.480 nm.

4. The cathode active material of claim 1, wherein:

the coating layer includes at least one of the layered crystalline structure and a spinel crystalline structure.

5. The cathode active material of claim 1, wherein:

a content of Mn contained in the coating layer is 0.15 to 0.45 mol % based on the total cathode active material.

6. The cathode active material of claim 1, wherein:

a content of nickel in metal in the lithium metal oxide is 80 mol % or more.

7. A lithium secondary battery, comprising:

a cathode containing the cathode active material of claim 1;

an anode containing an anode active material; and an electrolyte disposed between the cathode and the anode.

\* \* \* \* \*